UNITED STATES PATENT OFFICE.

ROBERT MARCHAND, OF AMSTERDAM, NETHERLANDS.

PROCESS FOR PREPARING HYDRATE OF TERPIN.

1,411,859. Specification of Letters Patent. Patented Apr. 4, 1922.

No Drawing. Application filed December 3, 1920. Serial No. 429,161.

*To all whom it may concern:*

Be it known that I, ROBERT MARCHAND, a subject of the Queen of the Netherlands, residing at Amsterdam, in the Province of North Holland, in the Kingdom of the Netherlands, have invented certain new and useful Improvements in or Relating to a Process for Preparing Hydrate of Terpin, (for which I have made application in the Netherlands Nov. 10, 1919, Serial No. 13,284 Ned;) and I do hereby declare that the following is a full, clear, and exact description of the same.

The common method of preparing hydrate of terpin consists in treating oil of turpentine with sulfuric acid or nitric acid in alcohol. It is also known to avoid the use of alcohol in this reaction. Up to the present however no theoretical output was obtained in this reaction and many by-products of small value were formed.

According to this invention however hydrate of terpin is obtained in nearly theoretical quantity.

The invention consists in mechanically mixing oil of turpentine, or pinene, with the acid in an inert atmosphere, for example, an atmosphere of carbonic acid or nitrogen. The mechanical mixing should be effected by vigorous agitation and should last until the transformation of pinene into hydrate of pinene is finished, for example 6 to 8 days.

With the new process oxidation of turpentine is wholly prevented and consequently a nearly theoretical output is obtained. The concentration of the acid, which is preferably sulfuric acid, is chosen, as is well known, in such a manner that the increase in concentration which the acid undergoes during the reaction in consequence of the formation of the hydrate is taken into account.

I claim as my invention:—

1. A process of preparing hydrate of terpin, consisting in mechanically mixing together, without the use of an inert filler oil of turpentine, an acid and water for several days continuously in an inert atmosphere; substantially as described.

2. A process of preparing hydrate of terpin, consisting in mechanically mixing together, without the use of an inert filler pinene, an acid and water for several days continuously in an inert atmosphere; substantially as described.

3. A process of preparing hydrate of terpin, consisting in mechanically mixing together, without the use of an inert filler oil of turpentine, sulphuric acid and water for several days continuously; substantially as described.

4. A process of preparing hydrate of terpin, consisting in mechanically mixing together, without the use of an inert filler pinene, sulphuric acid and water for several days continuously; substantially as described.

In testimony whereof I hereunto affix my signature, in the presence of two witnesses.

ROBERT MARCHAND.

Witnesses:
H. Y. KUYPERT,
H. Y. LANGENDYK.